(12) United States Patent
Ohashi et al.

(10) Patent No.: US 7,992,609 B2
(45) Date of Patent: Aug. 9, 2011

(54) PNEUMATIC TIRE WITH TREAD INCLUDING WAVY SIPES HAVING BRANCH PORTIONS

(75) Inventors: Toshiyuki Ohashi, Osaka (JP); Shouta Satou, Osaka (JP); Takashi Numata, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 846 days.

(21) Appl. No.: 11/926,353

(22) Filed: Oct. 29, 2007

(65) Prior Publication Data
US 2008/0115870 A1    May 22, 2008

(30) Foreign Application Priority Data
Nov. 17, 2006    (JP) .................... 2006-311786

(51) Int. Cl.
*B60C 11/12* (2006.01)
(52) U.S. Cl. .......... 152/209.21; 152/209.23; 152/DIG. 3
(58) Field of Classification Search ............. 152/209.18, 152/209.21, 209.23, DIG. 3
See application file for complete search history.

(56) References Cited

U.S. PATENT DOCUMENTS

| | | | | |
|---|---|---|---|---|
| 5,350,001 A | * | 9/1994 | Beckmann et al. | 152/DIG. 3 |
| 6,427,737 B1 | * | 8/2002 | Katayama | 152/DIG. 3 |
| 2002/0053383 A1 | * | 5/2002 | Kleinhoff et al. | 152/209.23 |
| 2005/0109438 A1 | * | 5/2005 | Collette et al. | 152/209.18 |
| 2006/0016533 A1 | * | 1/2006 | Ohashi | 152/151 |
| 2006/0027295 A1 | * | 2/2006 | Knispel et al. | 152/DIG. 3 |
| 2007/0272337 A1 | * | 11/2007 | Bovaird et al. | 152/DIG. 3 |

FOREIGN PATENT DOCUMENTS

| | | | |
|---|---|---|---|
| EP | 933235 | * | 8/1999 |
| JP | 9-183303 | | 7/1997 |
| JP | 2004-161166 | * | 6/2004 |
| JP | 2006-27558 | | 2/2006 |

OTHER PUBLICATIONS

Machine translation for Japan 2004-161166 (no date).*

* cited by examiner

*Primary Examiner* — Steven D Maki
(74) *Attorney, Agent, or Firm* — Fish & Richardson P.C.

(57) ABSTRACT

A sipe inner wall surface of a sipe is provided with a wavy first concave and convex row, a wavy second concave and convex row arranged in a sipe bottom side from the first concave and convex row so as to be spaced, and structured such that a wavelength is made shorter than the first concave and convex row so as to increase the number of waves, and a third concave and convex row extending toward the sipe bottom side in a branched manner while being inclined to a longitudinal direction side of the sipe with respect to a normal direction of a tread surface, and interposed between the first concave and convex row and the second concave and convex row so as to be connected to both elements.

3 Claims, 2 Drawing Sheets

PNEUMATIC TIRE WITH TREAD INCLUDING WAVY SIPES HAVING BRANCH PORTIONS

BACKGROUND OF THE INVENTION

1. Field of the Invention

The present invention relates to a pneumatic tire provided with a tread pattern having a land portion in which at least one sipe is formed, and is particularly useful as a studless tire.

2. Description of the Related Art

Conventionally, in a studless tire, a cut called a sipe is provided in a land portion of a block, a rib or the like, and a stable travel can be achieved on an ice road surface having a low wear coefficient on the basis of an edge effect generated by the sipe. As the sipe mentioned above, there has been known a so-called two-dimensional sipe in which a shape is not changed in a depth direction, and there is put for practical use a flat sipe in which a sipe inner wall surface is flat, and a waveform sipe 20 in which concave and convex rows extend in a normal direction ND of a tread surface as shown in FIG. 3.

In recent years, the number of the sipes tends to be increased for increasing an edge effect, however, if the number of the sipes is increased too much, a rigidity of the land portion is lowered and the land portion collapses excessively in spite that the number of the edges is increased. Then there is generated a problem that the edge effect becomes small, whereby an ice performance is lowered, or a stepped wear is generated between the sipes. Accordingly, a so-called three-dimensional sipe in which an excessive collapse is suppressed by changing a shape of the sipe in a depth direction has attracted attention.

There has been proposed various shapes as the shape of the three-dimensional sipe, for example, a sipe extending in a wavy shape on a sipe bottom while extending in a linear shape on a tread surface is described in Japanese Unexamined Patent Publication No. H9-183303. Further, in Japanese Unexamined Patent Publication No. 2006-27558, there is described a sipe in which the concave and convex rows of the sipe inner wall surface are inclined in a zigzag shape in a longitudinal direction side of the sipe with respect to the normal direction ND of the tread surface, such as a sipe 30 shown in FIG. 4. Further, in Japanese Unexamined Patent Publication No. 2004-161166, there is described a sipe in which a sipe inner wall surface is divided into two or more sections in a depth direction, and the number of the waves of the sipe in each of the portions is increased step by step toward the sipe bottom side.

However, in the sipe described in Japanese Unexamined Patent Publication No. H9-183303, an engaging effect of the concave and convex rows is small, and it is impossible to sufficiently suppress the collapse of the land portion. Further, in accordance with the sipe described in Japanese Unexamined Patent Publication No. 2006-27558, the convex stripe and the concave stripe extending in a diagonal direction are engaged at a time when the land portion collapses, whereby the excessive collapse is suppressed, however, since there is a tendency that a comparatively soft rubber is used for the tread rubber in recent years, it is necessary to execute a further improvement for sufficiently obtaining the effect of suppressing the collapse of the land portion.

Further, in the sipe described in Japanese Unexamined Patent Publication No. 2004-161166, since an end portion of the convex stripe or the concave stripe is arranged in a boundary where the number of the waves of the sipe is changed, a lower end of the convex stripe is engaged with an upper end of the convex stripe provided in the sipe inner wall surface opposing thereto in the depth direction, and the engaging position is provided along a longitudinal direction of the sipe, whereby there is a case that the edge effect generated by the sipe is lowered. In addition, there is a problem that it becomes very hard to manufacture a blade for forming the sipe and release a mold due to the concave-convex shape of the sipe inner wall surface mentioned above.

SUMMARY OF THE INVENTION

The present invention is made by taking the actual condition mentioned above, and an object of the present invention is to provide a pneumatic tire which can improve an ice performance or the like by sufficiently suppressing a collapse of a land portion.

The object can be achieved by the present invention having the following structure. The present invention provides a pneumatic tire provided with a tread pattern having a land portion forming at least one sipe, wherein a sipe inner wall surface of the sipe comprises:

a wavy first concave and convex row;

a wavy second concave and convex row arranged in a sipe bottom side from the first concave and convex row so as to be spaced, and structured such that a wavelength is made shorter than the first concave and convex row so as to increase the number of waves; and a third concave and convex row extending toward the sipe bottom side in a branched manner while being inclined to a longitudinal direction side of the sipe with respect to a normal direction of the tread surface, and interposed between the first concave and convex row and the second concave and convex row so as to be connected to both elements.

In accordance with the pneumatic tire in accordance with the present invention, since the sipe inner wall surface of the sipe is provided with the third concave and convex row inclined to the longitudinal direction side of the sipe with respect to the normal direction of the tread surface and extending so as to branch toward the sipe bottom side, it is possible to increase the diagonal component in comparison with the case that the concave and convex row is simply inclined, whereby it is possible to sufficiently improve the collapse suppressing effect of the land portion by increasing the engaging effect between the convex stripe and the concave stripe, and it is possible to achieve an excellent ice performance and wear performance.

Further, since the second concave and convex row provided in the sipe bottom side of the third concave and convex row is formed as such the wavy shape that the wave length is made shorter and the number of the waves is made larger than the first concave and convex row provided in the tread surface side of the third concave and convex row, it is possible to increase a grounding property by increasing the number of the waves of the sipe appearing on the tread surface in the middle of the wear, and it is possible to improve a wet performance in the middle of the wear. Further, since the third concave and convex row interposing between the first concave and convex row and the second concave and convex row extends toward the sipe bottom side in the branched manner so as to be connected to both the elements, the convex stripe and the concave stripe can be continuously provided, and the number of the waves of the sipe changes smoothly. Accordingly, it is easy to secure amplitude of the concave and convex rows, and it is easy to manufacture the blade and release mold as well as it is possible to maintain the effect of suppressing the collapse of the land portion.

In the above structure, it is preferable that the third concave and convex row comprises:

a main stem portion inclined to a longitudinal direction side of the sipe with respect to the normal direction of the tread surface, and connected to the first concave and convex row while having a thickness corresponding to the first concave and convex row; and a branch portion branched from the main stem portion inversely and connected to the second concave and convex row while having a thickness corresponding to the second concave and convex row.

In accordance with the structure mentioned above, since the third concave and convex row has the main stem portion extending in the diagonal direction, and the branch portion inclined in the inverse direction to the main stem portion, the diagonal components in the intersecting direction to each other are formed, and it is possible to suitably suppress the collapse while suppressing the shear deformation of the land portion. Further, since the main stem portion is connected to the first concave and convex row while having the thickness corresponding to the first concave and convex rows, and the branch portion is connected to the second concave and convex row while having the thickness corresponding to the second concave and convex row, it is possible to continuously and smoothly make the convex stripe and the concave stripe extend, and it becomes easier to manufacture the blade and release mold.

In the structure mentioned above, a non-branched portion extending from the tread surface to the sipe bottom without the concave and convex row being branched may be partly provided in the sipe inner wall surface. The non-branched portion can be used for achieving an adjustment of the number of the waves in a relation between the numbers of the waves of the first concave and convex row and the second concave and convex row, and the number of the waves before and after branching the third concave and convex row. For example, in the case that the third concave and convex row is branched into two ways, it is preferable that the number of the waves of the second concave and convex row is twice the number of the waves of the first concave and convex row, and otherwise, an excess and deficiency is generated in the convex stripe and the concave stripe. Accordingly, in the case mentioned above, the convex stripe and the concave stripe can be continuously provided by partly setting the non-branch portion in the sipe inner wall surface so as to regulate the number of the waves.

In the above structure, it is preferable that at least one of the first concave and convex row and the second concave and convex row extends in the normal direction of the tread surface. In the case that the first concave and convex row extends in the normal direction of the tread surface, since the concave and convex row extending in the diagonal direction is not exposed to the tread surface in the wear initial state in which the land portion tends to comparatively collapse, it is possible to suppress the generation of a irregular wear without forming an acute portion in the land portion piece. On the other hand, in the case that the second concave and convex row extends in the normal direction of the tread surface, it is possible to prevent a local stress concentration in the sipe bottom so as to suppress a generation of a crack or the like.

In the above structure, it is preferable that a branch point of the third concave and convex row is provided in a region which is between 0.2D and 0.8D from the tread surface of the sipe inner wall surface, in which a sipe depth is set to D. In accordance with the structure mentioned above, it is possible to securely increase the number of the waves of the sipe appearing on the tread surface in the middle of the wear so as to increase a grounding property, and it is possible to well increase a wet performance in the middle of the wear.

Figure 1:
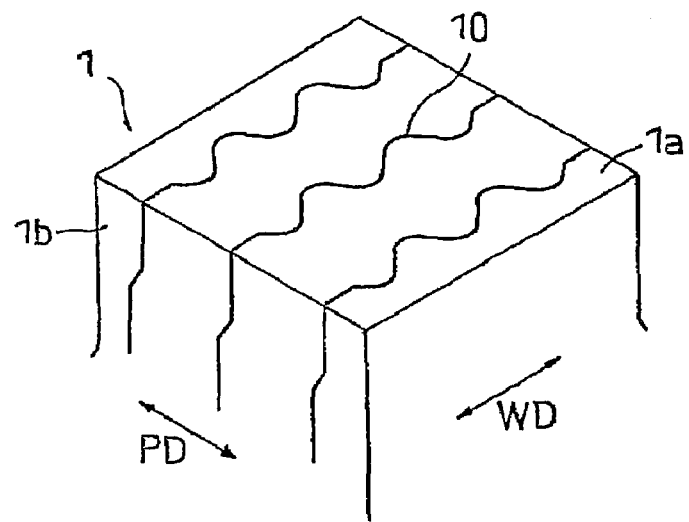
FIG. 1 is a perspective view showing an example of a land portion in accordance with a pneumatic tire of the present invention.

| DESCRIPTION OF REFERENCE NUMERALS | |
|---|---|
| 1 | block (example of land portion) |
| 1a | tread surface |
| 1c | sipe inner wall surface |
| 1d | sipe bottom |
| 10 | sipe |
| 11 | first concave and convex row |
| 12 | second concave and convex row |
| 13 | third concave and convex row |
| 13a | main stem portion |
| 13b | branch portion |
| 15 | non-branched portion |
| D | sipe depth |
| ND | normal direction of tread surface |
| P | branch point |

DETAILED DESCRIPTION OF THE PREFERRED EMBODIMENTS

Figure 2:
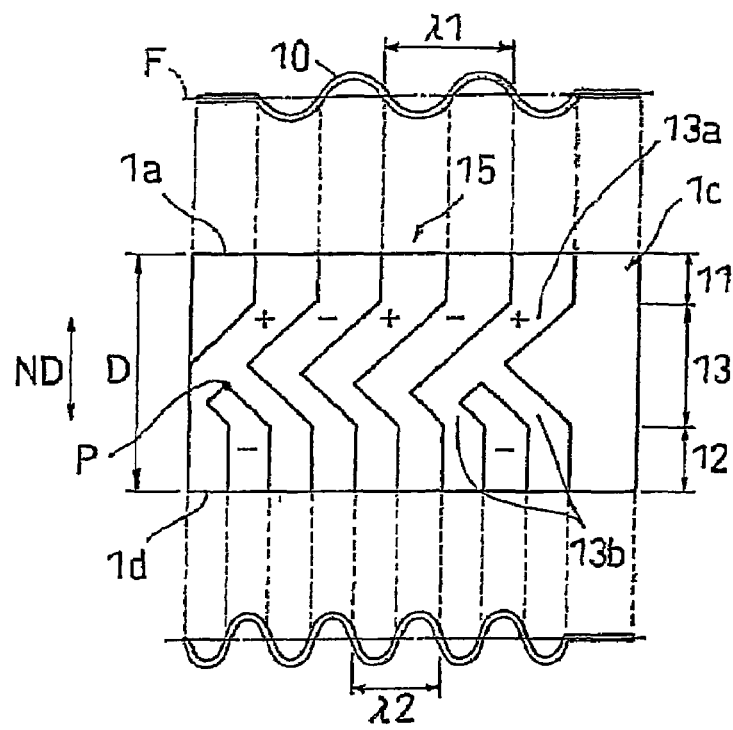
FIG. 2 is a plan view of a sipe and a front view of a sipe inner wall surface in the pneumatic tire in accordance with the present invention.

A description will be given below of an embodiment in accordance with the present invention with reference to the accompanying drawings. FIG. 1 is a perspective view showing an example of a land portion of a pneumatic tire in accordance with the present invention, and shows a part of a block corresponding to the land portion in an enlarged manner. FIG. 2 is a front view of a sipe inner wall surface of a sipe formed in the block, in which a plan view in a tread surface is shown in an upper side, and a plan view in a sipe bottom is shown in a lower side. Reference symbol "+" in the drawing denotes a convex stripe, and reference symbol "−" denotes a concave stripe. The concavity and convexity are based on a standard surface F (a virtual surface passing through a center of amplitude) of the sipe (the same matter is applied to FIGS. 3 and 4 mentioned above).

The pneumatic tire in accordance with the present invention is provided with a tread pattern having a land portion in which at least one sipe is formed. In the present embodiment, as shown in FIG. 1, there is shown an example in which three sipes 10 are formed in a block 1. The sipe 10 extends in a wavy shape on a tread surface 1a, and is formed as a both-side open sipe in which both ends thereof are open to a side wall surface 1b of the block 1 while a longitudinal direction thereof is in parallel to a tire width direction WD.

A sipe inner wall surface 1c of the sipe 10 is formed in a concave-convex shape as shown in FIG. 2, and is provided with a wavy first concave and convex row 11 arranged in the tread surface 1a side, a wavy second concave and convex row 12 arranged in a sipe bottom 1d side from the first concave and convex row 11 so as to be spaced, and a third concave and convex row 13 arranged between the first concave and convex row 11 and the second concave and convex row 12. In this case, "wavy shape" is not limited to a shape close to a sine wave such as the present embodiment, but includes such a shape that a wavy line extends zigzag while bending, a shape obtained by alternately combining a straight line and a curved line, and the like.

The first concave and convex row 11 is formed in the wavy shape as mentioned above, and extends in a normal direction ND of the tread surface 1a. The second concave and convex row 12 is formed in the same wavy shape as the first concave and convex row 11 except a shape in which a wavelength is made shorter than the first concave and convex row 11 (λ2<λ1) and the number of the waves is increased, and is common in a groove width and an amplitude (a sum of heights of both side top portions) of the sipe, the structure that the concave and convex row extends in the normal direction ND of the tread surface 1a, and the like.

The third concave and convex row 13 extends toward the sipe bottom 1d side in a branched manner while inclining to a longitudinal direction (a lateral direction in FIG. 2) side of the sipe 10 with respect to the normal direction ND of the tread surface 1a, and is interposed between the first concave and convex row 11 and the second concave and convex row 12 so as to be connected to both the elements. Accordingly, a diagonal component of the concave and convex row is increased in comparison with the sipe 30 shown in FIG. 4, whereby it is possible to increase an engaging effect between the convex stripe and the concave stripe, and it is possible to sufficiently suppress an excess collapse of the block 1 at a time when a longitudinal force along a tire circumferential direction PD is generated.

The third concave and convex row 13 has a main stem portion 13a inclining to the longitudinal direction side of the sipe 10 with respect to the normal direction ND of the tread surface 1a and connected to the first concave and convex row 11 while having a thickness corresponding to the first concave and convex row 11, and a branch portion 13b branched from the main stem portion 13a so as to be inclined inversely, and connected to the second concave and convex row 12 while having a thickness corresponding to the second concave and convex row 12. Accordingly, diagonal components in an intersecting direction to each other is formed in the third concave and convex row 13, and it is possible to suitably suppress the collapse while suppressing a shear deformation of the block 1. Further, the convex stripe and the concave stripe can continuously and smoothly extend, and it is easy to manufacture a blade for forming the sipe 10 and release mold.

It is preferable that each of angles of inclination of the main stem portion 13a and the branch portion 13b with respect to the normal direction ND of the tread surface 1a is between 10 and 80 degree, and more preferably, is between 30 and 60 degree. If these angles are smaller than 10 degree, there is a tendency that the effect of suppressing the collapse of the block 1 on the basis of the engaging effect between the convex stripe and the concave stripe becomes small. Further, in the case that these angles are more than 80 degree, it is hard to set the concave and convex row due to the angle of inclination being too large. In this case, it is preferable that a difference of angle between both the elements is ±10 degree, whereby it is possible to effectively suppress the shear deformation of the block 1 mentioned above. In the present embodiment, each of the angles of both the elements is set to 45 degree.

In the present embodiment, a non-branched portion 15 extending from the tread surface 1a to the sipe bottom 1d without the concave and convex row being branched is partly provided in a center in a longitudinal direction of the sipe inner wall surface 1c. In the sipe inner wall surface 1c shown in FIG. 2, since the first concave and convex row 11 has three convex stripes, and the second concave and convex row 12 has five convex stripes, it is impossible to make all the convex stripes continuously extend only by the third concave and convex row 13 branched into two ways. Accordingly, in the present embodiment, the number of the waves is regulated by setting the non-divided portion 15, whereby all the convex strips can continuously extend.

In the present embodiment, the non-branched portion 15 has a portion which is inclined in the longitudinal direction side of the sipe 10 with respect to the normal line ND of the tread surface 1a and is bent in a C-shaped form, in such a manner as to be along the branched concave and convex rows adjacent to both sides. Accordingly, in the same manner as the other portions, it is possible to suppress the collapse of the block 1 on the basis of the engaging effect between the convex stripe and the concave stripe.

In the present invention, it is preferable that the first concave and convex row 11 extends at ±50 degree with respect to the normal direction ND of the tread surface 1a, and it is more preferable that it extends in the normal direction ND of the tread surface 1a such as the present embodiment. Accordingly, since the concave and convex row extending in the diagonal direction is not exposed to the tread surface in a wear initial state in which the block 1 tends to comparatively collapse, it is possible to suppress a generation of an irregular wear without forming any acute portion in the land piece.

Further, in the present invention, it is preferable that the second concave and convex row 12 extends at ±50 degree with respect to the normal direction ND of the tread surface 1a, and it is more preferable that it extends in the normal direction ND of the tread surface 1a such as the present embodiment. Accordingly, it is possible to prevent a local stress concentration in the sipe bottom 1d so as to suppress a generation of a crack and a chunk out (breakage or dropout) of the block piece.

In the case that a sipe depth is set to D, it is preferable that a branch point P of the third concave and convex row 13 is provided in a region which is 0.2 D to 0.8 D from the tread surface 1a of the sipe inner wall surface 1c, and it is more preferable that it is provided in a region which is 0.4 D to 0.7 D from the tread surface 1a. Accordingly, it is possible to securely increase the number of the waves of the sipe appearing on the tread surface in the middle of the wear so as to increase a grounding property, and it is possible to well increase a wet performance in the middle of the wear. In this case, the branch point P is a point at which the third concave and convex row 13 is branched and an increase of the number of the waves starts.

It is preferable that the amplitude of the first concave and convex row 11 is between 0.5 and 1.5 mm, and it is preferable that the amplitudes of the second concave and convex row 12 and the third concave and convex row 13 are the same as the amplitude of the first concave and convex row 11 in the light of maintaining the collapse suppressing effect of the block 1. Further, it is preferable that a groove width of the sipe 10 is between 0.2 and 0.7 mm for achieving a sufficient edge effect, and it is preferable that the sipe depth D is between 30 and 80% of the main groove depth.

The other portion than the block 1 in the tread pattern may have any pattern, and for example, there is exemplified a structure in which a block or a rib is provided in right and left sides of the block 1. The block 1 is not limited to the rectangular shape in the plan view as mentioned above, but may employ any one of a parallelogram, a V-shaped form, a polygonal shape, or a curved line motif and the like.

In the present invention, it is possible to employ a rib extending in a straight shape or a zigzag shape along the tire circumferential direction PD, in place of the block 1 corresponding to the land portion. In the case mentioned above, it is possible to sufficiently improve the collapse suppressing effect so as to improve the ice performance or the like, by setting the concave-convex shape as mentioned above on the sipe inner wall surface of the sipe formed in the rib.

In the present invention, since the collapse suppressing effect of the land portion is great, it is possible to increase the number of the edge so as to further increase the edge effect by increasing the number of the sipe 10 so as to increase the sipe density. From this point of view, in the present invention, it is preferable that the sipe density is between 0.05 and 0.2 mm/mm$^2$. In this case, the sipe density is a value obtained by dividing the total of the lengths of all the sipes by an area of the tread surface.

In general, a plurality of sipes are formed with respect to one block or one rib, however, the adjacent sipes may have the same shape, or may have different wave shapes, angles of inclination, cycles of concavity and convexity, and amplitudes. In this case, it is preferable that the adjacent sipes have the same shapes for improving a mold releasing property after a vulcanization molding.

In the present invention, it is possible to apply the sipe structure as mentioned above to all the land portions within the tread pattern, however, the sipe structure as mentioned above may be applied only to a partial land portion within the tread pattern.

The pneumatic tire in accordance with the present invention is identical to the normal pneumatic tire except the structure in which the sipe as mentioned above is formed in the land portion of the block, the rib or the like, and it is possible to employ the conventionally known material, shape, structure, manufacturing method and the like for the present invention.

Since the collapse suppressing effect of the land portion is great, the present invention is useful in the tire provided with the tread pattern of the block motif, and since it is possible to improve the ice performance, the present invention is useful particularly as a studless tire (a winter tire).

Other Embodiment (1) The present invention is not limited to the embodiment mentioned above, but can be variously improved and modified within the scope of the present invention, for example, may be structured such that the sipe is formed by a one-side open sipe or a closed sipe. Further, a standard surface of the sipe may be slightly inclined with respect to the normal direction of the tread surface (for example, equal to or less than 15 degree), or the longitudinal direction of the sipe may be inclined with respect to the tire width direction (preferably within 45 degree).

(2) In the embodiment mentioned above, there is shown the example in which the third concave and convex row 13 is branched into two ways, however, the present invention is not limited to this, but the third concave and convex row 13 may be branched into three ways or more in correspondence to the number of the waves of the first concave and convex row 11 and the second concave and convex row 12.

(3) In the embodiment mentioned above, there is shown the example in which the first concave and convex row 11 is exposed to the tread surface 1a initially, and the second concave and convex row 12 reaches the sipe bottom 1d, however, the present invention is not limited to this, but may be structured such that a region coming to the tread surface 1a side of the first concave and convex row 11 and a region coming to the sipe bottom 1d side of the second concave and convex row 12 are formed as a flat surface sipe.

EXAMPLES

An example tire which concretely shows the structure and effect of the present invention will be explained. In this case, each of performance evaluations of the tire is executed as follows.

(1) Ice Braking Performance

A test tire is installed to an actual car (Japanese FR sedan of 3000 cc class), and a braking distance at a time of traveling on an ice road surface, applying a braking force from a speed 40 km/h and actuating an ABS is measured. An evaluation is shown by an index number in the case of setting a comparative example 1 to 100, and indicates that the larger the numerical value is, the better the ice braking performance is.

(2) Wear Performance

The test tire is installed to the actual car mentioned above, and a stepped wear amount between the sipes (a step between the sipes caused by the wear) at a time of traveling on a paved roadway at 8000 km is measured. An evaluation is shown by an index number in the case of setting a comparative example 1 to 100, and indicates that the larger the numerical value is, the better the wear performance is.

(3) Wet Braking Performance

The test tire used for evaluating the above wear performance is installed to the actual car mentioned above, a braking force is applied from a speed 100 km/h while traveling on the wet road surface, and a braking distance to the speed 20 km/h is measured. An evaluation is shown by an index number in the case of setting a comparative example 1 to 100, and indicates that the larger the numerical value is, the better the wet braking performance is.

Comparative Example 1

Figure 3:
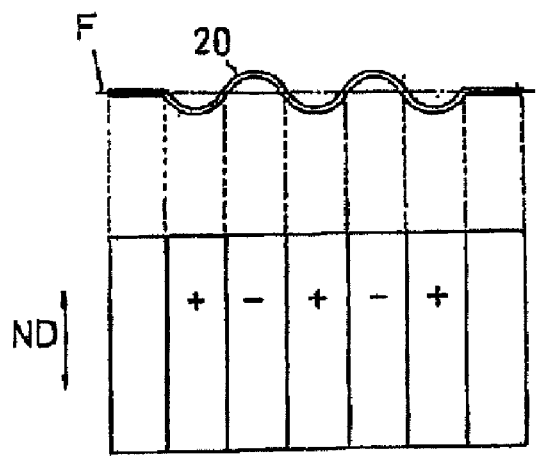
FIG. 3 is a plan view of a sipe and a front view of a sipe inner wall surface in a conventional pneumatic tire.

A radial tire (size 205/65R15) having a tread pattern provided with a square block (longitudinal 30 mm, horizontal 30 mm, both-side open sipe) having the sipe shown in FIG. 3 on a whole surface (five rows) is set to a comparative example 1. In this case, a sipe depth is set to 8 mm, a groove width is set to 0.3 mm, a sipe interval is set to 5 mm, amplitude is set to 1.2 mm, and a wavelength is set to 4.0 mm.

Comparative Example 2

Figure 4:
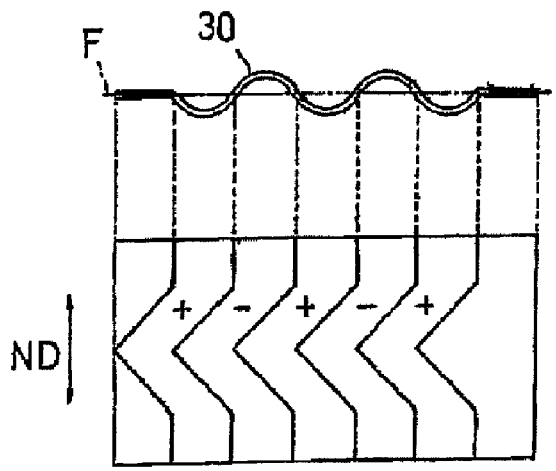
FIG. 4 is a plan view of the sipe and a front view of the sipe inner wall surface in a conventional pneumatic tire.

A radial tire having the same specification as the comparative example 1 except a structure in which the sipe shown in FIG. 4 is provided in place of the sipe shown in FIG. 3 is set to a comparative example 2. In this case, an angle of inclination of the concave and convex row with respect to the normal direction of the tread surface is set to 45 degree.

Example 1

A radial tire having the same specification as the comparative example 1 except a structure in which the sipe shown in FIG. 2 is provided in place of the sipe shown in FIG. 3 is set to an example 1. In this case, a wavelength of the first concave and convex row is set to 4.0 mm, a wavelength of the second concave and convex row is set to 3.0 mm, each of angles of inclination of the main stem portion and the branch portion of the third concave and convex row with respect to the normal direction of the tread surface is set to 45 degree, and a branch point is set to a position at 0.4 D from the tread surface. Results of the evaluation are shown in Table 1.

TABLE 1

|  | Comparative Example 1 | Comparative Example 2 | Example 1 |
|---|---|---|---|
| Ice braking performance | 100 | 107 | 111 |
| Wear performance | 100 | 107 | 110 |
| Wet braking performance | 100 | 107 | 109 |

In the result of evaluation, each of the performances (the ice braking performance, the wear performance and the wet braking performance) is improved in the comparative example 2 in comparison with the comparative example 1, however, each of the performances is further improved in the example 1. Accordingly, it is known that it is possible to sufficiently suppress the collapse of the block by the concave-convex shape provided in the sipe inner wall surface of the sipe, particularly the third concave and convex row having a lot of diagonal components, in the example 1. Further, it is known that it is possible to increase the number of the waves of the sipe appearing on the tread surface so as to improve the grounding property.

What is claimed is:

1. A pneumatic tire provided with a tread pattern having a land portion forming at least one sipe, wherein a sipe inner wall surface of the sipe comprises:
   a wavy first concave and convex row;
   a wavy second concave and convex row arranged in a sipe bottom side from the first concave and convex row so as to be spaced, and structured such that a wavelength is made shorter than the first concave and convex row so as to increase the number of waves; and
   a third concave and convex row extending toward the sipe bottom side in a branched manner while being inclined to a longitudinal direction side of the sipe with respect to a normal direction of the tread surface, and interposed between the first concave and convex row and the second concave and convex row so as to be connected to both elements, wherein
   a main stem portion is inclined to a longitudinal direction side of the sipe with respect to the normal direction of the tread surface, and is connected to the first concave and convex row while having a thickness corresponding to the first concave and convex row; and
   a first branch portion is branched at a first branch point from the main stem portion inversely and is connected to the second concave and convex row while having a thickness corresponding to the second concave and convex row; and a second branch portion is branched at a second branch point from the main stem portion inversely and is connected to the second concave and convex row while having a thickness corresponding to the second concave and convex row, the second branch point being located at a depth greater than the depth at which the first branch point is located.

2. The pneumatic tire according to claim 1, wherein at least one of the first concave and convex row and the second concave and convex row extends in the normal direction of the tread surface.

3. The pneumatic tire according to claim 1, wherein a branch point of the third concave and convex row is provided in a region which is between 0.2D and 0.8D from the tread surface of the sipe inner wall surface, in which a sipe depth is set to D.

* * * * *